July 19, 1960  G. D. PATERSON  2,945,274
TOGGLE FASTENERS
Filed Oct. 24, 1958  4 Sheets-Sheet 1

Inventor
Gavin Dykes Paterson
By
Attorney

July 19, 1960 G. D. PATERSON 2,945,274
TOGGLE FASTENERS
Filed Oct. 24, 1958 4 Sheets-Sheet 2
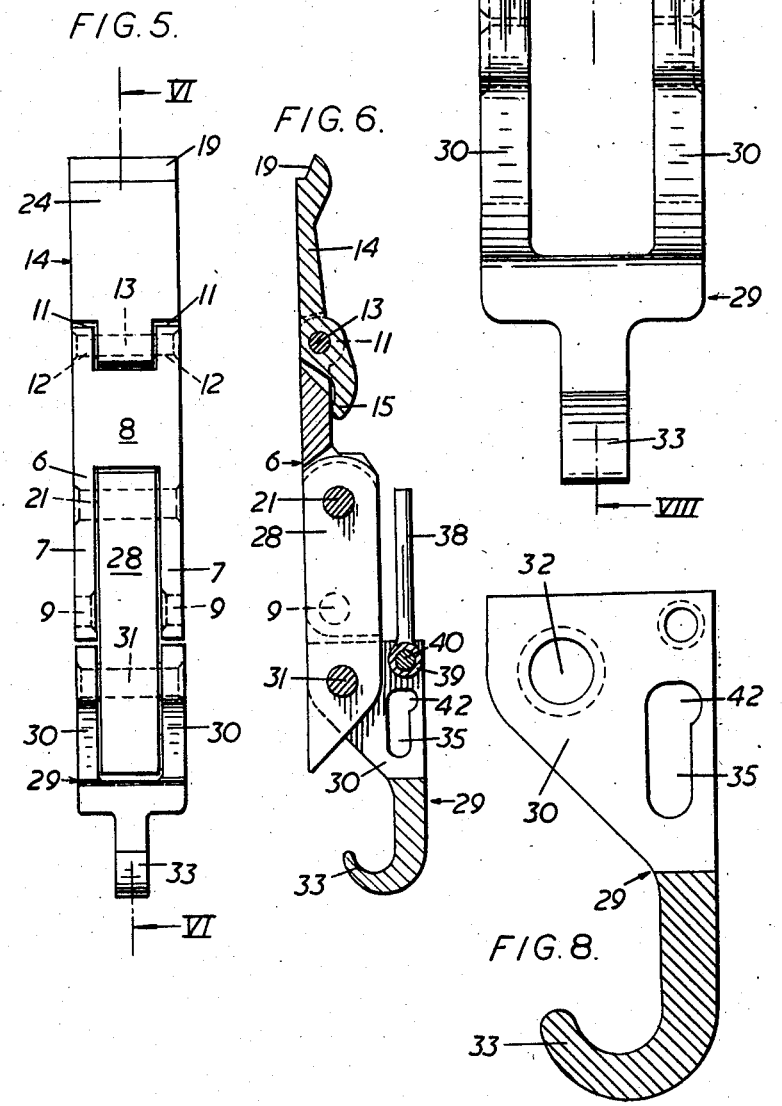

July 19, 1960  G. D. PATERSON  2,945,274
TOGGLE FASTENERS
Filed Oct. 24, 1958  4 Sheets-Sheet 3
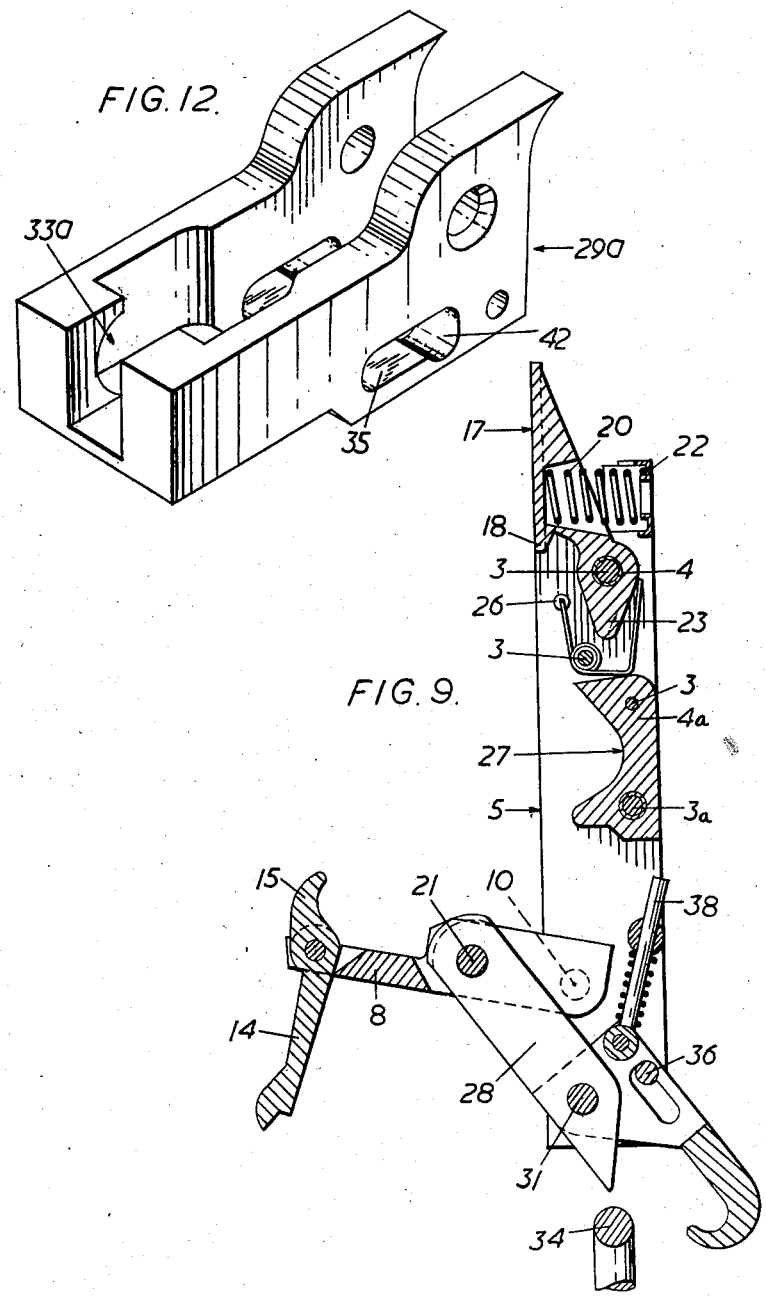
Inventor
Gavin Dykes Paterson
By
Attorney July 19, 1960
G. D. PATERSON
2,945,274
TOGGLE FASTENERS
Filed Oct. 24, 1958
4 Sheets-Sheet 4
FIG. 10.
FIG. 11.
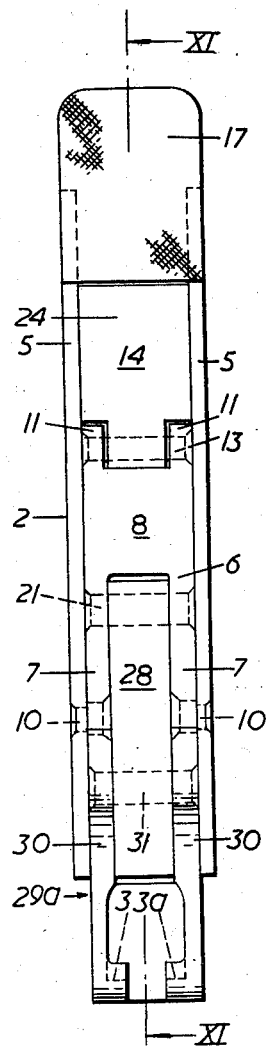
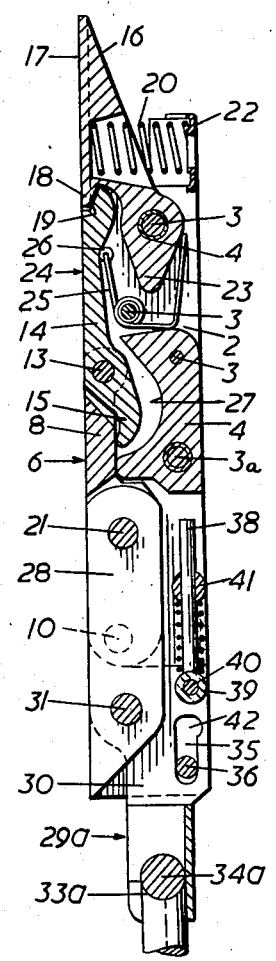
Inventor
Gavin Dykes Paterson
By
Attorney United States Patent Office 2,945,274
Patented July 19, 1960

2,945,274

TOGGLE FASTENERS

Gavin Dykes Paterson, Hillington, Glasgow, Scotland, assignor to K.A.C. Limited, Glasgow, Scotland, a British company Filed Oct. 24, 1958, Ser. No. 769,434

Claims priority, application Great Britain Nov. 15, 1957

9 Claims. (Cl. 24—68)

This invention concerns toggle fasteners adapted for securing together members (e.g. two parts of an aircraft engine or other cowling, a removable panel and its supporting structure, fairings and the like) which are, when released, movable away from one another.

Toggle fasteners for the aforesaid purposes generally comprise a primary part adapted to be carried by one of the members to be secured by the fastener, and a secondary part adapted to be carried by the other of the members, a locking lever and link arrangement being provided to draw the primary and secondary parts together by rocking of the lever about a fulcrum on the secondary part towards a locking position in which the lever and link are in an over-center condition so that tension tending to separate the fastener parts acts to maintain the lever in its locking position. Usually the link is pivotally secured to the primary part and to the locking lever between the ends of the latter, while the locking lever has an end adapted for detachable pivotal connection with the fulcrum to permit complete separation of the fastener parts.

When such fasteners are intended for installation with the parts thereof flush with the front surfaces of the members to be secured thereby, the edges of said members have to be provided with cut-outs or recesses to accommodate the link when the fastener is locked, and since in many situations, particularly in aircraft installations, the members to be secured together achieve much of their strength and rigidity from stiffening beads, flanges, ribs or other elements extending along their edges, the presence of cutouts and recesses in such edges can seriously weaken the members and necessitate the provision of additional structure in the vicinity of the fasteners to restore to the members the loss of strength due to the cutouts or recesses. This usually results in excessive structure weight or other structural inefficiency.

An object of the present invention is to provide a toggle fastener especially suitable for such purposes as are mentioned above and which may be installed with its front surface flush with the surfaces of the members to be secured by the fastener and with little or no weakening of the adjacent edge portions of the members.

Thus from one aspect the present invention provides a toggle fastener comprising a recessed housing adapted to be carried by one of two members to be secured together by the fastener; a locking lever pivoted near one of its ends to said housing and rockable between a locking position in which the front surface of the lever is flush with the front of the housing and closes part of the recess therein, and an unlocked position in which the free end of the lever projects forwardly out of the housing recess; a link in said recess and pivoted at one of its ends between the ends of the locking lever; and a connecting member carried by the link and extending from an end of the housing for detachable connection to the second of said two members behind the front surface thereof, rocking of said locking lever from its unlocked to its locking position moving said connecting member toward the housing recess, the locking lever and link passing over-centre as the locking lever approaches its locking position.

Preferably said connecting member is pivotally carried by the link so that the latter is free to rock with the locking lever while the connecting member remains in a predetermined attitude with respect to the housing. With such an arrangement the connecting member may be guided for rectilinear movement with respect to the housing although in accordance with a further feature of the invention the extremity of the connecting member may be caused to follow a path which facilitates its detachment from and attachment to the second member during approach of the locking lever to, and during departure of the locking lever from, respectively, its said unlocked position.

Thus, for example, said connecting member may conveniently terminate in a hook-like structure adapted to engage a complementary element such as a lipped flange or bead, or a stirrup, carried by the rear of the second member near the edge thereof, such hooklike structure having a forward-facing mouth which is engaged with said complementary element by forward movement of the extremity of the connecting member upon departure of the locking lever from its unlocked position.

More specifically an object of the invention is to provide a toggle fastener comprising a recessed housing adapted to be carried by one of two members to be secured together by the fastener with its front flush with the front surface of such member; a locking lever pivoted near one of its ends to said housing and rockable between a locking position in which its front surface lies flush with the front of the housing and closes part of the recess therein, and an unlocked position in which the free end of the lever projects forwardly out of the housing recess; a link adapted to be positioned in said housing recess and pivoted at one of its ends between the ends of the locking lever; and a connecting member articulated to the other end of said link adapted to be reciprocated by rocking of the locking lever, said connecting member having a hooked or hook-like extremity extending from an end of the housing for engaging a complementary element on or adapted to be carried by the second of said two members and a cooperating pin positioned in a slot guide means disposed on the connecting member, rocking of said locking lever from its unlocked to its locking position swinging said hook-like extremity in the direction into engagement with said complementary element and thereafter drawing said extremity toward the housing, the locking lever and link passing over-center as the locking lever approaches its locking position.

Usually it will be preferable for the hook-like extremity of the connecting member to have a forward-facing mouth, this extremity being swung forwardly upon departure of the locking lever from its unlocked position.

The swinging of the extremity of the connecting member during rocking of the locking lever in the vicinity of its unlocked position may conveniently be achieved by providing suitable co-operating guide means on the connecting member and housing respectively; thus in accordance with a further feature of the invention the connecting member and housing may be provided with co-operating pin and slot means including a slot aligned with the desired direction of movement of the connecting member after the swinging thereof during locking, such slot having a length less than the distance moved in said direction by the end of the link articulated to the connecting member for the whole rocking travel of the locking lever, and said end of the link being articulated to the connecting member at a position offset from the pin and slot means. With such an arrangement, the connecting member will be moved, during rocking of the locking lever, in the direction defined by the pin and slot means until the pin reaches the end of the slot, whereafter continued movement of the link with the locking lever will result in swinging of the connecting member about the axis of the pin of the pin and slot means.

To ensure that swinging of the connecting member occurs at the proper part of the rocking of the locking lever, resilient biasing means may act on the connecting member to oppose swinging thereof until the pin and slot means are in the relative positions in which such swinging should occur.

Thus in accordance with a feature of the invention, spring means may act to urge the pin and slot means to the relative positions thereof in which swinging of the connecting member is to occur. Moreover, in accordance with a further feature of the invention, such spring means may have a toggle action, passing over-center during initial swinging of the connecting member upon approach of the locking lever to its unlocked position, so that thereafter the spring means act to assist completion of the said swinging and ensure completion of rocking of the locking lever to its unlocked position.

This latter arrangement is particularly desirable when the fastener is to be so installed that rocking of the locking lever to its unlocked position involves upward and forward movement of the free end of the locking lever so that gravity would normally tend to restore the lever to its locking position. With the arrangement described above said spring means act to hold the locking lever in its unlocked position and prevent inadvertent displacement of the lever from such position, thus facilitating drawing together the two members to be secured by the fastener (or by a plurality of fasteners) by ensuring that a connecting member will not foul the complementary element when the members are drawn together.

The pin and slot means may, moreover, be so formed that the connecting member has slight freedom laterally of the slot axis when in position for said swinging, so that as the spring means pass over-center slight lateral displacement of the connecting member will occur to bring the spring means further over-center and enable such means to develop a greater couple assisting swinging of the connecting member.

The locking lever may be retained in its locking position solely by reason of tension between the two members secured by the fastener and the over-center condition of the lever and link, but since in many cases it must be assured that the fastener remains locked under conditions in which tension may not act continuously between the two members, latch means may be provided for releasably retaining the locking lever in its locking position.

Thus in accordance with a further feature of the invention, the fastener may include a latch plate closing part of the housing recess and adapted to engage the locking lever or a part associated therewith when in its locking position, such latch plate being movable, e.g. by digital pressure, into the housing recess to disengage the locking lever or part associated therewith. Moreover, such movement of the latch plate may be effective to initiate ejection of the free end of the locking lever, or of said part associated therewith, out of the housing recess to facilitate its being grasped to rock the locking lever to its unlocked position.

Thus the latch plate may conveniently be carried by a latch lever pivoted within the housing recess and having an arm which moves forwardly, upon said inwards movement of the latch plate, to engage the rear of the free end of the locking lever or part associated therewith to eject same from the housing recess.

Particularly when the fastener is intended to be operated under heavy tension loads between the members secured thereby, the locking lever may be provided with an extension lever pivoted to the free arm of the locking lever and which may be rocked, when the locking lever is in its locking position, to an opening position in which the extension lever projects forwardly to be grasped by the hand of the operator to enable the latter effectively to use his strength in pulling the locking lever and link over-center for rocking it to its unlocked position. Such extension lever may conveniently be adapted to form a co-linear extension of the locking lever free arm, closing a further part of the housing recess and lying with its front surface flush with the front of the housing, when the locking lever is in its locking position. The extension lever may further be adapted for co-operation with the latch means when such are provided.

Moreover, the extension lever may be pivoted between its ends to the free arm of the locking lever, so that rocking of the extension lever to its opening position causes one arm of such lever to move rearwardly in the housing recess; with such an arrangement, the housing may be provided with cam means for engagement by such rearwardly-moving arm of the extension lever during the latter part of its movement, thereby to force the extension lever and the free arm of the locking lever forwardly out of the housing recess towards and preferably beyond, the over-centre position of the locking lever and link, the arrangement thus providing a mechanical advantage to the operator unlocking the fastener.

In order that the invention may be thoroughly understood an embodiment thereof, and a modification of such embodiment, will now be described by way of example and with reference to the accompanying drawings, in which:

Figure 5 is a front view of the extension lever, locking lever, link and connecting member assembly of the fastener of Figures 1 and 2;

Figure 6 is a section on line VI—VI of Figure 5;

Figure 7 is a front view, and on an enlarged scale, of the connecting member;

Figure 8 is a section on line VIII—VIII of Figure 7;

Figure 9 shows the fastener of Figures 1 to 8 with the locking lever in its unlocked position;

Figure 10 is a view corresponding with Figure 1 but showing a modification of the fastener shown in the latter;

Figure 11 is a section on line XI—XI of Figure 10; and

Figure 12 is an enlarged fragmentary perspective view of the connecting member of the fastener of Figures 10 and 11.

Figure 1:
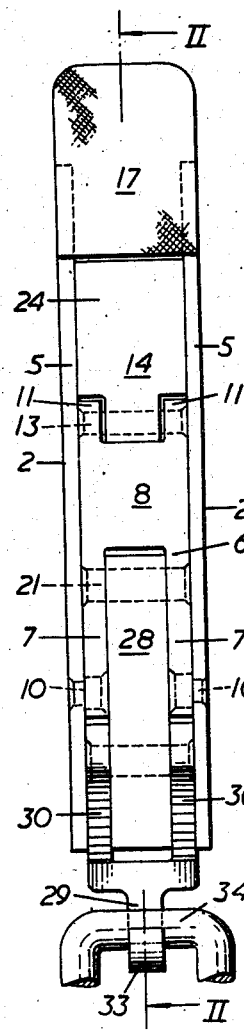
Figure 1 is a front view of a fastener constructed in accordance with the invention.

Referring to the drawings, the fastener illustrated comprises a generally rectangular recessed housing 1 constituted by a pair of spaced parallel side plates 2 united by transverse pins 3, 3a and spacer elements 4, 4a at spaced locations towards the rear of the recess defined between the side plates 2. The housing is adapted for attachment to one of two members to be secured by the fastener in a cut-out or recess in such member so that the front edges 5 of the side plates 2 are flush with the front surface of the member. For securing the housing to such member, bolts or other like elements may be employed, such bolts being attached to the side plates at suitable positions. If the fastener is to be used on a curved member then the side plates or at least the front edges thereof may have curvature to match that of the member, the illustrated fastener being, however, intended for use on a flat or substantially flat member.

A locking lever 6 having a bifurcated end is pivoted at or near the extremities of the arms 7 of its bifurcated end between the side plates 2 of the housing so as to be rockable between a locking position (shown in Figures 1 and 2) in which its front surface lies flush with the front edges 5 of the side plates, and an unlocked position (Figure 9) in which its free end 8 projects forwardly out of the housing recess. Conveniently, as shown, the arms 7 of the bifurcated end of the locking lever are furnished with aligned bores 9 through which pass aligned fulcrum pins 10 secured to the adjacent side plates of the housing.

The free end 8 of the locking lever 6 terminates in a pair of spaced parallel side cheeks 11 having aligned bores 12 through which passes a pivot pin 13 also passing through an extension lever 14 between the ends of the latter, one arm 15 of the extension lever being formed to engage the rear surface of the locking lever 6 when the extension lever 14 is co-linear with the latter. In the locking position of the locking lever 6 the latter closes part of the housing recess while the front surface of the extension lever 14 lies flush with the front edges 5 of the housing side plates 2 beyond the free end 8 of the locking lever, the extension lever 14 closing a further part of the housing recess. If the side plates have curved front edges to match the curvature of a member on which the fastener is to be used, the locking lever and the extension lever will have corresponding curvature of at least their front surfaces.

A latch lever 16 is pivoted on spacer 4 on one of the transverse pins 3 between the side plates 2 near the ends thereof adjacent to the extension lever 14 when the locking lever is in its locking position, said latch lever 16 carrying a latch plate 17 which lies flush with the end portions of the front edges 5 of the side plates 2 and closes the remainder of the housing recess at that end of the housing. Said latch plate 17 is formed with a latch nose 18 which is adapted to engage over a complementary projection 19 at the end of the extension lever 14 to hold the latter in co-linear alignment with the locking lever 6 when the latter is in its locking position. Thus the latch plate 17 serves to retain the locking lever 6 in its locking position, through intermediary of the extension lever 14. The latch plate 17 is urged forwardly of the housing recess by means of a compression spring 20 acting between the rear of the latch plate and a transverse support 22 spanning the side plates of the housing, but is prevented from emerging from the housing recess by suitable stop means (not shown) acting between the side plates and the latch lever 16. However, digital pressure applied to the latch plate 17 will rock the latch lever 16 to disengage the latch nose 18 of the latch plate from the projection 19 of the extension lever 14.

The latch lever 16 has an ejector arm 23 which on depression of the latch plate 17 into the housing recess swings forwardly within the latter to strike the rear of the arm 24 of the extension lever 14 beyond the free end 8 of the locking lever 6 and to rock the extension lever to an opening position in which such arm 24 thereof projects forwardly out of the housing recess. A torsion spring 25 carried by a transverse pin 3 between the side plates 2 of the housing also acts on the rear of said arm 24 of the extension lever 14 to assist the ejector arm 23 on the latch lever 16 in rocking the extension lever towards its said opening position. The spring 25 is of hairpin form carrying a sleeve 26 for engaging the arm 24 of the extension lever.

Between the side plates of the housing and near the rear of the housing recess behind the free end of the locking lever when the latter is in its locking position is disposed an arcuate cam 27, constituted by the front surface of block-like spacer 4a, adapted to be engaged by the arm 15 of the extension lever 14 which moves into the housing recess as the other arm 24 of the extension lever is ejected from the latter by the action of said torsion spring 25 and ejector arm 23. The arrangement is such that during the latter part of the rocking of the extension lever 14 to its opening position in which it extends substantially perpendicular to the locking lever 6, the rearward moving arm 15 of the extension lever engages said cam 27 and thus forces the locking lever free end 8 out of the housing recess towards its unlocked position.

A link 28 is pivoted on a pin 21 at one of its ends, pin 21 securing the link to the locking lever 6 between the ends of the latter, this link lying between the arms 7 of the bifurcated end of the locking lever. In the locking position of the locking lever 6 the link 28 has its front surface flush with said arms 7 of the locking lever and fills the space therebetween.

Figure 2:
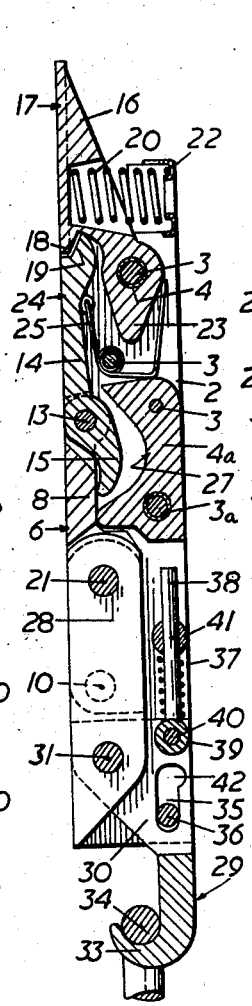
Figure 2 is a section on line II—II of Figure 1.
Figure 3:
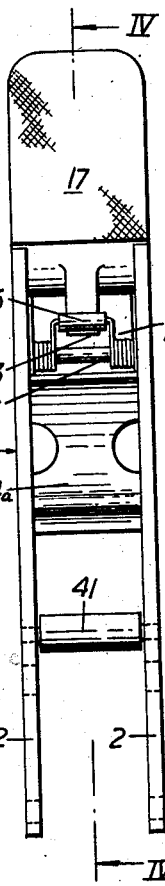
Figure 3 is a front view of the housing, latch lever and cam means of the fastener of Figures 1 and 2.
Figure 4:
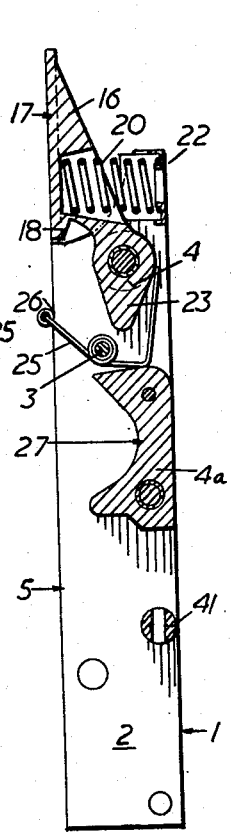
Figure 4 is a section on line IV—IV of Figure 3.

The other end of the link 28 is articulated to a connecting member 29 which comprises a pair of spaced parallel triangular plates 30 articulated to the link 28 by means of a pivot pin 31 passing through aligned bores 32 in said plates 30 and a bore in the end of the link. At their apices and beyond the end of the housing recess said triangular plates 30 carry a hook-like structure 33 having a forwardly facing mouth, this hook-like structure being adapted for detachable connection with a complementary element on the other of two members to be secured together by the fastener, such complementary element being, for example, a stirrup secured to such other member at the rear thereof or, if desired, being constituted by a lipped bead or flange integral with or secured to such other member. If, for example, the said second member is an aircraft structural panel having an edge stiffening element extending along its rear surface adjacent to the edge thereof, such stiffening element may be formed for engagement with the hook-like structure of the fastener. In Figure 2, the structure 33 is indicated as engaging a circular-section stirrup 34 as a complementary element.

Said triangular plates 30 of the connecting member fit slidably between the side plates 2 of the housing so that the connecting member may be reciprocated longitudinally of the housing by rocking of the locking lever 6. The connecting member plates 30 each have a slot 35 substantially aligned with the shank of the hook-like structure 33 and a guide pin 36 extends through these slots and is secured at its ends to the housing side plates. The pivot pin 31, which forms the axis of articulation between the connecting member plates 30 and the link 28 is offset forwardly of the plane containing the axes of said slots 35 and the slots have a length which is less than the displacement of the link 28 longitudinally of the housing for the full travel of the locking lever 6 from its unlocked to its locking position so that whilst the connecting member 29 can move longitudinally of the housing upon rocking of the locking lever 6, the possible longitudinal displacement of the connecting member is less than that of the link with the result that swinging of the connecting member about said guide pin 36 must occur to accommodate the full longitudinal displacement of the link.

It is arranged that when the locking lever 6 is rocked from its locked position towards its unlocked position the connecting member 29 moves longitudinally in the direction outwardly of the housing recess but before the locking lever 6 achieves its unlocked position the guide pin 36 engages the ends of the said slots 35 so that the final part of the movement of the locking lever 6 to its unlocked position results in rearward swinging of the hook-like structure 33 of the connecting member about an axis defined by the guide pin 36.

To ensure that such swinging of the connecting member 29 occurs at the desired part of the travel of the locking lever 6 between its said positions, spring means act on the connecting member to urge the latter in the direction out of the housing recess. Such spring means comprise a helical compression spring 37 surrounding the stem 38 of a T-piece having a tubular head 39 encircling a transverse pin 40 bridging the connecting member plates 30 in a position beyond the ends of the slots 35 therein and slightly rearwardly offset from the plane containing the axes of the said slots. Said stem 38 is slidable in a transverse bore in a pin 41 carried rotatably by the side plates 2 of the housing and with its axis substantially in the plane containing the axes of the slots 35 in the connecting member plates 30. The said compression spring 37 acts on said rotatable pin 41 and tends to urge the connecting member 29 in the direction out of the housing recess and also produces a couple tending to swing the hook-like structure 33 of the connecting member forwardly.

When the connecting member 29 moves in the direction out of the housing recess upon rocking of the locking lever 6 towards its unlocked position, the spring 37 assists such movement of the connecting member and also resists any tendency of the hook-like structure 33 to swing rearwardly. However, as the locking lever 6 approaches its unlocked position, the outwards movement of the connecting member 29 is obstructed by engagement of the guide pin 36 with the ends of the said slots 35 and accordingly the hook-like structure 33 of the connecting member commences to swing rearwardly during continued rocking of the locking lever 6. This carries the head 39 of the T-piece through the plane containing the axes of the said slots so that the spring 37 thereafter acts to aid rearward swinging of the hook-like structure 33, the spring 37 in effect acting as a toggle going over center to reverse the swinging couple it exerts on the connecting member. A snap-action is provided by the said slots 35 having rearward extensions 42 at the ends engaged by the guide pin 36 during swinging of the connecting member so that as the said spring 37 goes over-center the connecting member 29 is slightly forwardly displaced to take the spring 37 further over-center without further movement of the locking lever 6. Thus as the spring 37 goes over-center the connecting member 29 and spring 37 assume positions in which the latter exerts a marked couple tending to assist swinging of the hook-like structure 33 rearwardly and the final part of the movement of the locking lever 6 to its unlocked position.

Conversely, on rocking the locking lever 6 from its unlocked position towards its locking position, the action of said spring 37 ensures that the hook-like structure 33 of the connecting member will first be swung forwardly until the spring 37 goes over-center and the connecting member 29 moves slightly rearwardly to bring the guide pin 36 back on to the axes of the slots 35, whereafter further rocking of the locking lever 6 will draw the connecting member 29 in the direction into the housing recess, any tendency to rearward swinging of the hook-like structure 33 being opposed both by the spring 37 and by the couple resulting from the offset of the link connection to the connecting member from the axis of the shank of the hook-like structure 33.

When the fastener is locked the plane containing the axes of the pivot pins securing the link 28 to the locking lever 6 and to the connecting member 29 lies slightly rearwardly of the common axis of the fulcrum pins 10 so that tension in the link maintains the locking lever in its locking position; that is to say, as the locking lever 6 approaches its locking position the lever 6 and link 28 go over-center in the well known manner of known toggle fasteners.

Figures 10 to 12 show a modification of the fastener of Figures 1 to 9. In the fastener of Figures 10 to 12, the parts that correspond with parts of the fastener of Figures 1 to 9 have been indicated with the same references as in Figures 1 to 9 and will not be further described.

The fastener of Figures 10 to 12 has a connecting member 29a which is formed of a heavy channel section the web of which is reduced in thickness towards its extremity and the flanges of which are recessed to permit the ends of the cross-piece of a T-shaped complementary element 34a (e.g. the head of a T-bolt) to enter and be received in hook-like ends 33a at the extremities of the flange recesses.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

I claim:
1. A toggle fastener for securing two members together, said fastener comprising a recessed housing adapted to be carried by a first of said members with its front face flush with the front surface of said first member, a locking lever pivoted adjacent one of its ends to said housing and rockable between a locking position in which the front surface of said lever lies flush with the front face of said housing to partially close the recess therein and an unlocked position in which the free end of said lever projects forwardly from said recess, a link pivoted at one of its ends between the ends of said lever and adapted to be positioned in said recess, a connecting member articulated to the other end of said link adapted to be reciprocated by rocking said lever, said connecting member being provided with a hooked extremity extending from an end of said housing for engagement with a complementary element carried by the second of said members, guide slot means disposed on said connecting member, a guide pin mounted on said housing and positioned in said slot means, said slot means being shorter than the longitudinal distance moved by the axis of articulation between said link and said connecting member during rocking of said lever between its locking and unlocked positions and being disposed parallel to and spaced from the reciprocal line of said axis to cause said connecting member to swing about said pin during such rocking of said lever, said lever when rocked from its unlocked to its locking position swinging said hooked extremity into engagement with said element and thereafter drawing said extremity toward said housing wherein said lever and said link pass over-center as said lever approaches its locking position.

2. The toggle fastener of claim 1, including resilient biassing means acting on said connecting member to urge said hooked extremity thereof away from said housing.

3. The toggle fastener of claim 2, in which said biassing means comprise spring means cooperating with said pin and said slot means.

4. The toggle fastener of claim 3, in which said spring means constitute a toggle which passes over-center during initial swinging of said connecting member upon approach of said locking lever to its said unlocked position.

5. The toggle fastener of claim 1, including an extension lever pivoted to the locking lever and rockable when the locking lever is in its said locking position to an opening position in which the extension lever projects forwardly of the locking lever.

6. The toggle fastener of claim 1, in which said extension lever constitutes a co-linear extension of the free end of the locking lever, closing a part of the housing recess and lying with its front surface flush with the front of the housing when the locking lever is in its said locking position.

7. The toggle fastener of claim 6, said extension lever being pivoted between its ends to the locking lever whereby rocking of the extension lever to its said opening position moves one end thereof into the housing recess, cam means in said housing recess co-operating with such extension lever end to urge the locking lever towards its unlocked position during the latter part of the rocking of the extension lever to its opening position.

8. The toggle fastener of claim 1, in which said connecting member is of channel-section having recesses in its flanges constituting a pair of parallel hooks.

9. The toggle fastener of claim 1 including a latch lever pivoted in said recess, a latch plate carried by said latch lever closing part of said recess and adapted to engage said locking lever to retain it in its locking position, said latch plate being movable into said recess to disengage said locking lever, and an arm on said latch lever positioned to move forwardly to engage and rock said locking lever from its locking position towards its unlocked position when said plate is moved into said recess.

References Cited in the file of this patent

UNITED STATES PATENTS

| | | |
|---|---|---|
| 132,247 | Burdict et al. | Oct. 15, 1872 |
| 513,727 | Potts | Jan. 30, 1894 |
| 1,481,126 | Cupp | Jan. 15, 1924 |
| 2,187,537 | Bruun | Jan. 16, 1940 |
| 2,832,446 | Smith et al. | Apr. 29, 1958 |

FOREIGN PATENTS

| | | |
|---|---|---|
| 171,853 | Austria | July 10, 1952 |
| 355,470 | Italy | Jan. 7, 1938 |
| 639,178 | France | Mar. 5, 1928 |
| 644,699 | Great Britain | Oct. 18, 1950 |
| 681,949 | Great Britain | Oct. 29, 1952 |
| 715,159 | Great Britain | Sept. 8, 1954 |